United States Patent [19]

Smith

[11] 4,113,186
[45] Sep. 12, 1978

[54] TIRE GRINDING SYSTEM

[75] Inventor: George William Smith, Woodbridge, Conn.

[73] Assignee: USM Corporation, Farmington, Conn.

[21] Appl. No.: 760,264

[22] Filed: Jan. 18, 1977

[51] Int. Cl.² .............................................. B02C 23/00
[52] U.S. Cl. ...................................... 241/24; 241/29; 241/DIG. 31
[58] Field of Search ................... 241/24, 29, DIG. 31

[56] References Cited

U.S. PATENT DOCUMENTS

| | | | |
|---|---|---|---|
| 2,471,043 | 5/1949 | Schenck | 241/DIG. 31 |
| 3,923,256 | 12/1975 | Dorner | 241/76 |
| 3,966,125 | 6/1976 | Finkbeiner | 241/DIG. 31 |

Primary Examiner—Granville Y. Custer, Jr.
Attorney, Agent, or Firm—Donald N. Halgren; Richard B. Megley; Vincent A. White

[57] ABSTRACT

A system for treating rubber tires which reduces the tires to a particulate agglomeration wherein cord and rubber matter therein can be separated. A further treating of those rubber particles reduces them to screen size. The system requires the steps of: (a) initially debeading the tire; (b) cutting the tire into chunks; (c) regulating the quantity of chunks as they pass through the system; (d) grinding the tire in a high intensity mixer; (e) passing the grind to a hammer mill to loosen the rubber and the cord from one another; (f) separating the rubber particles out in a separator, and (g) then grinding the rubber particles to a size of about 30 to 100 mesh as a final product. Oversized pieces of rubber discharged from the separator near the end of the system would be returned to the high intensity mixer.

1 Claim, 1 Drawing Figure

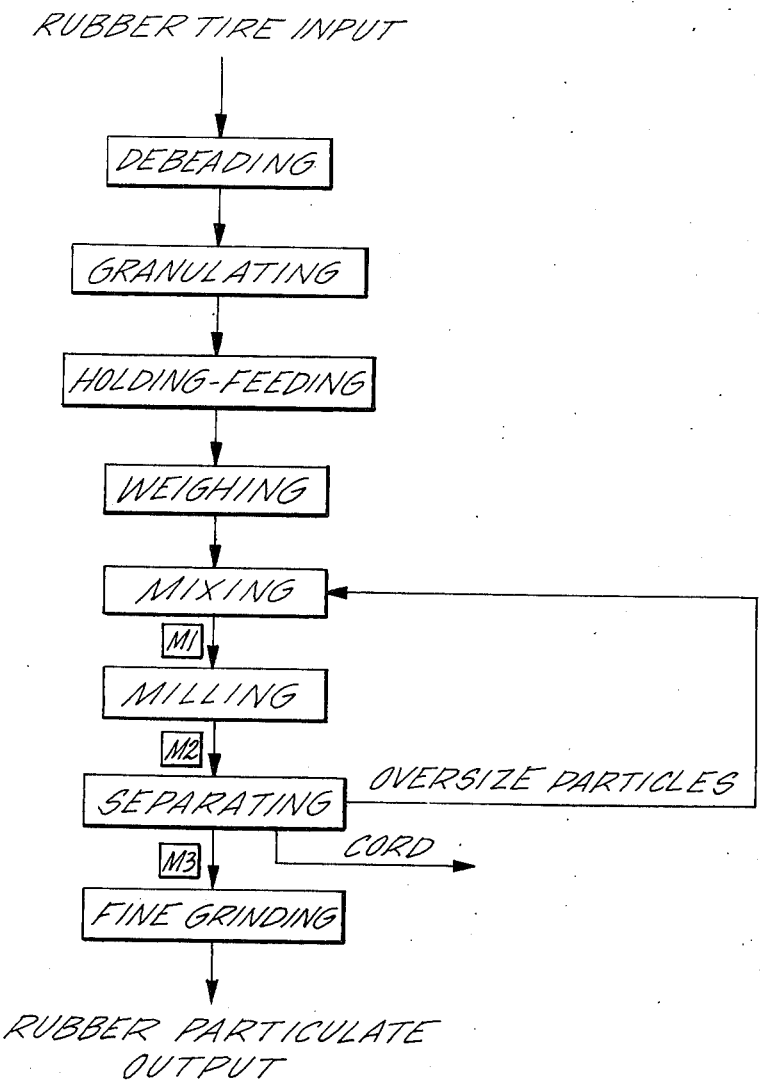

TIRE GRINDING SYSTEM

BACKGROUND OF THE INVENTION

1. Field of the Invention

The present invention relates to a system and a method for grinding rubber tires to a particulate size to separate the rubber and non rubber constituents therefrom, permitting the recovery of the rubber.

2. Prior Art

The accumulation of old rubber tires is a serious environmental problem. Some of the tires can be bundled together to help make artificial reefs on seacoasts, but this does away with only a portion of the problem. Other ways to dispose of the old tires cause additional nuisances. The tires cannot be burned because that would cause air pollution. The tires are difficult to "dump" because of the bulk of their carcasses, and they have a high resistance to degradation, which means they would remain intact for many years.

The rubber, however, from these old tires may be reuseable for various products; it may be used as a filler and mixed with asphalt, or it may be reclaimed and put back into use as a rubber product. Reclaimation of the old tires of the prior art have usually been initially treated by hand debeading, or by a hand operated machine, the debeaded tires having thereupon been cut into smaller pieces, and the tire pieces ground in different operational stages. The rubber is then separated from any cord in the tire pieces by sifting, utilizing wide arrangements, or by screening. Recent examples of prior art include U.S. Pat. Nos. 3,923,256 and 3,966,125. Each of the prior art patents rely on complicated arrangements utilizing screening and grinding.

SUMMARY OF THE INVENTION

The present invention comprises a method for grinding rubber tires to separate the cord from the rubber, permitting the rubber to be reused as a filler or as another rubber material. The method includes a mechanical arrangement to debead the steel beads from the rim of the tire. The tire is then fed to a granulator where it is chopped into small pieces. The tire pieces are transferred to a holding hopper and then a weighing scale. After predetermined weights of tire pieces are accumulated on the scale, the tire pieces are deposited into a mixing unit where the rubber is ground from any cord in the tire. Thereupon the mass is transferred to a hammer mill which further reduces the rubber pieces to particle size and also to physically loosen the cord from the rubber. The product then goes to a screw conveyor which feeds a separator to segregate and remove the rubber from the cord and oversize particles. The oversize particles are returned to the mixer for further reduction and cycling. The separator feeds the rubber particulate output to a fine grinder reducing the rubber to about 30 mesh which is then ready for reuse.

BRIEF DESCRIPTION OF THE DRAWING

The objects and advantages of the invention can be more easily understood with reference to the FIGURE which shows a block diagram of the tire grinding system.

DETAILED DESCRIPTION OF THE PREFERRED EMBODIMENTS

Referring now to the block diagram, as shown in the FIGURE, there is depicted a system to grind old rubber tires, which system begins with an input of rubber tires. The tires are stood upright on a tire debeading machine. The debeading machine has a knife arrangement that cuts into the sidewall of the tire and severs its rim portions which contain a steel wire bead. The debeaded tire carcass is then transferred by a conveyor, from the debeading machine to a granulating machine. The granulating operation is performed by a granulating machine which may comprise an arrangement of rotating knives adjacent an arrangement of stationary knives, beneath which there is disposed a screen. The knives reduce the tire carcass to pieces of about 2.5 cm. in breadth.

The granulator discharges the 2.5 cm. chunks of the tires onto a conveyor belt or transport mechanism capable of transferring the chunks to a hopper which stores them. The conveyor belt or transport mechanism is shown in the diagram simply as an arrow. A feeder device, such as a screw mechanism, draws out the proper amount of tire chunks from the hopper, and deposits them on a weigh scale for a weighing operation. The weigh scale is a conveyor arrangement placed on levers on a scale. Once a proper weight of tire chunks is reached, say from 100 to 500 pounds, depending on the size of the system, the conveyor on the scale discharges its load into a mixing machine.

The mixer may be a high intensity batch mixer or a continuous mixer. If it were the latter, the weigh scale would be omitted, and a feed regulator would govern the flow rate of tire chunks out of the granulator. The mixer comprises an arrangement of rotors that grind the chunks of tire down to approximately about a 30 mesh, or about 0.6mm. The mixer deposits its particulate output onto another conveyor arrangement. This conveyor arrangement may pass the particulate matter adjacent an initial magnet device M1 to remove loose pieces of magnetic material, such as iron or steel, from the tire particulate material.

After the particulate material has passed the initial magnet device M1, it is introduced into a milling station comprising a hammer mill. The hammer mill is a machine having steel bars that are each hinged at and swingable about a rotating axis. The side walls of the hammer mill is roughened in a saw-tooth configuration. The bars swing around and beat the tire particulate matter against the side walls of the machine, loosening the cord from the rubber. The cord may be comprised of nylon, rayon, fiberglass, steel or other material. The product of the hammer mill goes to another conveyor to pass adjacent another magnet device M2 to remove additional magnetic particles therefrom. The conveyor dumps the tire particles into a separating station.

The separating station is a separator comprised of several vibrating screens. The screens are disposed in a layered relationship with one another, and each at a slight slope with respect to the horizontal. The tire cord material floats across the surface of the topmost vibrating screen and is withdrawn as surplusage therefrom. Any oversize tire particles pass through the first topmost vibrating screen, but get stopped by the second screen and are recycled back to the input of the mixing machine. The particles of rubber, that is, those portions of the tire that have been reduced to about approximately 30 mesh, are drawn from the separating machine and then may pass adjacent still another magnetic device M3 to remove residual elements of magnetic material, then the rubber particles pass to a fine grinding station. It is to be noted that the magnetic devices could be placed almost anywhere in the system. The fine grinding station is comprised of a grinder that may have an arrangement of moving knives that reduce the rubber particles between the knives and a saw-tooth edge of the machine, producing a relatively uncontaminated rubber particulate matter ranging in size from about approximately 30 to 100 mesh. That is, from about 0.50 mm. to about 0.14 mm. in breadth. The rubber particulate matter removed from the fine grinding station is the final product of the tire grinding system.

It has been shown by the above method, that a rubber tire may be more simply recycled when the tire is debeaded, granulated into chunks, regulated and fed into a high intensity mixer to grind the chunks down to a finer size, hammered to loosen the cord and non-rubber material from the rubber tire particles, separated into its constituents one from another, and only those separated rubber tire particles ground down to a size to be useful as filler material or in rubber products.

Having thus described my invention, what I claim as new and desired to secure by Letters Patent of the United States is:

1. A process for treating rubber tires to break them down to a reduced size comprising:
   debeading the inside rims of the tires;
   transferring the tires to a granulator;
   granulating the tires into chunks of tires of about 2.5 cm. in breadth;
   transferring the chunks of tires to a holding unit and feeder arrangement;
   feeding said chunks of tires to a weight unit;
   weighing said chunks of tires to reach a predetermined quantity of from about 100 to about 500 pounds;
   transferring said predetermined quantity of chunks of tires to a high intensity mixing machine;
   grinding said chunks of tires in said high intensity mixing machine into smaller tire particles of about a 30 mesh size;
   separating magnetically any metal from the 30 mesh size particles;
   transferring said smaller tire particles into a hammer mill;
   beating said smaller tire particles in said hammer mill, loosening the rubber portions and cord portions of said particles from one another;
   transferring said loosened rubber portions and cord portions of said particles to a separating machine;
   separating magnetically any metal a second time from the loosened tire portions;
   separating small rubber particles from cord particles through several layers of vibrating screens;
   directing any oversize tire particles back to said mixing machine;
   transferring said small rubber particles to a grinder;
   separating magnetically any metal a third time from the small rubber particles; and
   grinding said small rubber particles into a fine grind rubber product of up to about a 100 mesh size.

* * * * *